(12) United States Patent
Nacman et al.

(10) Patent No.: US 7,894,094 B2
(45) Date of Patent: Feb. 22, 2011

(54) SYSTEM AND METHOD FOR IMAGE ROTATION

(75) Inventors: Aron Nacman, Henrietta, NY (US); Daniel A. Mohabir, Walworth, NY (US); Lisa M. Schlachter, Henrietta, NY (US); Dawn M. Lapietra, Rochester, NY (US); James P. Guy, Rochester, NY (US); Brian R. Caffee, Farmington, NY (US)

(73) Assignee: Xerox Corporation, Norwalk, CT (US)

( * ) Notice: Subject to any disclaimer, the term of this patent is extended or adjusted under 35 U.S.C. 154(b) by 1342 days.

(21) Appl. No.: 10/946,655

(22) Filed: Sep. 22, 2004

(65) Prior Publication Data
US 2005/0073695 A1 Apr. 7, 2005

Related U.S. Application Data

(60) Provisional application No. 60/506,135, filed on Sep. 26, 2003.

(51) Int. Cl.
*G06F 15/00* (2006.01)

(52) U.S. Cl. ............ 358/1.17; 358/1.2; 358/1.15; 358/1.16

(58) Field of Classification Search ............ 358/1.2, 358/1.17, 1.15, 1.16
See application file for complete search history.

(56) References Cited

U.S. PATENT DOCUMENTS

| | | | |
|---|---|---|---|
| 4,419,007 A | 12/1983 | Kingsley | 355/14 SH |
| 4,743,974 A | 5/1988 | Lockwood | 358/285 |
| 4,893,257 A * | 1/1990 | Dominguez et al. | 358/1.11 |
| 4,916,746 A * | 4/1990 | Yeschick | 382/297 |
| 5,012,434 A | 4/1991 | Zietlow et al. | 364/523 |
| 5,151,797 A * | 9/1992 | Nosaki et al. | 358/474 |
| 5,463,451 A | 10/1995 | Acquaviva et al. | 355/233 |
| 5,483,354 A | 1/1996 | Kessels et al. | 358/444 |
| 5,488,464 A | 1/1996 | Wenthe, Jr. et al. | 355/233 |
| 5,644,784 A * | 7/1997 | Peek | 710/24 |
| 5,657,431 A | 8/1997 | Plakosh et al. | 395/115 |
| 5,680,204 A | 10/1997 | Ferrara | 355/311 |
| 5,973,721 A * | 10/1999 | Bergmans et al. | 347/262 |
| 6,271,929 B1 * | 8/2001 | Zhao | 358/1.18 |
| 6,307,966 B1 * | 10/2001 | Chapin | 382/232 |
| 6,757,447 B2 * | 6/2004 | Yamaguchi et al. | 382/293 |
| 2002/0044291 A1 * | 4/2002 | Tsuji | 358/1.9 |
| 2002/0186390 A1 * | 12/2002 | Hara | 358/1.9 |

* cited by examiner

*Primary Examiner*—Edward L Coles
*Assistant Examiner*—Mark R Milia
(74) *Attorney, Agent, or Firm*—Philip E. Blair; Fleit Gibbons Gutman Bongini & Bianco P.L.

(57) ABSTRACT

A system and method to provide 180-degree rotation of image data at full throughput. The system includes a memory access controller that writes bursts of image data into a rotation buffer. The image data is then read out of the rotation buffer in the reverse order from which it was written to thereby accomplish rotation. By alternating the position in the rotation buffer in which the image data is written such that an image is either written into the buffer from top and read from the bottom or written into the buffer from the bottom and read out from the top, a one page rotation buffer of can be used to concurrently process two pages.

12 Claims, 3 Drawing Sheets

SYSTEM AND METHOD FOR IMAGE ROTATION

CROSS-REFERENCE TO RELATED APPLICATION

This application is based on and, to the fullest extent possible, claims priority from Provisional Patent Application No. 60/506,135, filed Sep. 26, 2003.

FIELD OF THE INVENTION

The present disclosure generally relates to system and method for providing 180-degree rotation of image data. The present teachings have particular application to duplex scanning systems capable of scanning both sides of a hardcopy document advancing along a paper path. More particularly, the present teachings include a system and method to process and store in memory images obtained from a duplex scanning system.

BACKGROUND OF THE INVENTION

High-speed digital copiers are widely available and their use in mid-size offices or as departmental printers/copiers is becoming commonplace. In addition to printing and copying functions, it is known that facsimile and/or digital scanning for copying, printing, faxing and/or disk storage (locally or networked computer) can be provided in a single unit. Such devices may be encompassed by the term "printer", and are also known as "digital copier", "multifunction" or "multimode" machines.

The speed at which digital copiers are capable of generating and printing images on output media is continually increasing. However, when considering the overall performance or throughput of a device, the rate at which these devices are capable of printing images on output media is only one factor to consider. In addition, one should also consider the speed at which information from hardcopy original documents is captured and processed. The rate at which digital copiers capture and process information from hardcopy documents is typically slower than the rate at which they can print pages. Thus, when performing copying or scanning operations, many such devices are limited by the speed at which information from hardcopy documents is captured and processed.

Briefly reviewing, digital copiers typically use a constant velocity transport (CVT) document feeding system or similar feeding device when capturing or scanning information from hardcopy documents. It is known that CVT type scanning devices can provide rapid and closely spaced document exchange times at the imaging station to obtain document feeding and scanning at greater than 50 scanned documents per minute. In addition, CVT type scanning devices can be used with a variety or mixture of document sizes, types, weights, thickness and materials as well as documents which may have curls, wrinkles, tears, "dog-ears", cut-outs, overlays, tape, paste-ups, punched holes, staples, adhesive or slippery areas, or other irregularities. Merely by way of one example, a complete description of CVT document feeding system is described and shown in U.S. Pat. No. 5,488,464, issued Jan. 30, 1996 to Steven J. Wenthe, Jr., et al. and incorporated herein by reference.

As has been described in the prior art, a common method for duplex scanning an input document with a CVT type scanning device includes scanning or imaging a first (simplex) side at an exposure station; using an inversion mechanism to invert and reverse the path of the input document; bringing the second (duplex) side into the same exposure station; and scanning or capturing the second side at the exposure station. See, for example, U.S. Pat. No. 4,419,007. Such inversion, however, requires sheet movement changes and additional mechanisms to start and stop the inversion mechanism. The change in direction and the additional mechanisms required to implement such change may create losses in productivity, reduce throughput, increase the possibility of document jams, and increase the number of components.

Duplex document scanning systems which can capture image data from both sides of a document as the document is moved along a continuous, non-inversion path are also well known. Such duplex scanning systems include two separate imaging stations, one for each of the two sides of the duplex document, along the document path. As a document traverses the path, each side of the document is imaged with a scanning element such as a raster input scanner (RIS). The RIS may be, for example, a full width array (FWA) type, or a CCD array or chip with lens image reduction. Duplex document scanning systems provide increased speed at the expense of increased hardware and software complexity and increased system resource requirements (e.g., memory, components, etc.). Examples of such duplex scanning systems can be found in U.S. Pat. Nos. 4,743,974 (Lockwood), 5,463,451 (Acquaviva et al.) and 5,680,204 (Ferrara), the teachings of each being incorporated herein by reference.

SUMMARY OF THE INVENTION

As described above, the overall performance of a digital copier can be limited by the speed at which information from hardcopy documents is captured and processed. Thus, there is an incentive to provide improved devices to capture and process of information from hardcopy documents. One aspect of the teachings herein discloses an improved method and system for the capture and processing of information from duplex hardcopy documents. A further aspect of the teachings herein provides a system and method to concurrently process two images obtained from duplex scanning a document using dual scanners and store the processed images in image memory. Another aspect of the teachings herein is a method and system to process and store in image memory the two images captured at the imaging stations within a duplex scanning device to enable duplex copies to be printed by a digital copier at full speed.

In order to enable simultaneous duplex document scanning to concurrently process two images and print a duplex output document, the second image must be rotated 180 degrees so as to be print ready with the correct orientation. In accordance with one aspect of the teachings herein, there is disclosed a system and method to process the image data (including rotating the appropriate images 180 degrees to thereby obtain the correct orientation) and store the processed images in memory at full speed and in real time.

In accordance with one or more aspects of the teachings herein there is disclosed a method of processing image data, comprising: receiving image data from a duplex scanning device, the image data including first side data captured from a first scanning station and second side data captured from a second scanning station; processing the second side data to generate rotated data, the processing including writing the second side data into a rotation buffer in a fill order, and reading the second side data from the rotation buffer in an order reverse of the fill order; and providing the first side image data and the rotated image data to an image output terminal.

In accordance with one or more aspects of the teachings herein there is further disclosed a method of processing image data, comprising: receiving first image data; receiving second image data; writing the first image data into a memory block according to a first fill order, the memory block being defined by a range of addresses from a first address to a second address, the first fill order placing the first image data into the memory block from a start address near the first address to a stop address near the second address; reading the first image data from the memory block in an order reverse of the fill order; and writing the second image data into the memory block according to a second fill order, the second fill order placing the second image data into the memory block beginning at an address near the second address; wherein the steps of writing the second image data into the memory block and reading the first image data from the memory block alternately write bursts of the second image data to and read bursts of the first image data from the memory block.

In accordance with one or more aspects of the teachings herein there is further disclosed a system for generating duplex copies from hardcopy originals, comprising: a scanning device capturing scanned image data from a document, the scanning device having a first scanning station for capturing image data from a first side of the document and a second scanning station for capturing image data from a second side of the document; a rotation processor generating rotated image data; and an image output terminal connected to receive the rotated image data. The rotation processor includes a scanline buffer receiving the scanned image, a rotation buffer, and a direct memory access controller, the direct memory access controller operating to write the second side data into a rotation buffer in a fill order, and reading the second side data from the rotation buffer in an order reverse of the fill order.

BRIEF DESCRIPTION OF THE DRAWINGS

The teachings and embodiments disclosed herein may be described with reference to the accompanying drawings, which are provided for purposes of illustrating various aspects of the teachings and embodiments and are not to be construed as limiting the same, wherein.

DETAILED DESCRIPTION

The present description is directed in particular to elements forming part of, or cooperating more directly with an apparatus for or method of processing image data in accordance with teachings and embodiments disclosed herein. It is to be understood that elements not specifically shown or described may take various forms well known to those skilled in the art.

Figure 1:
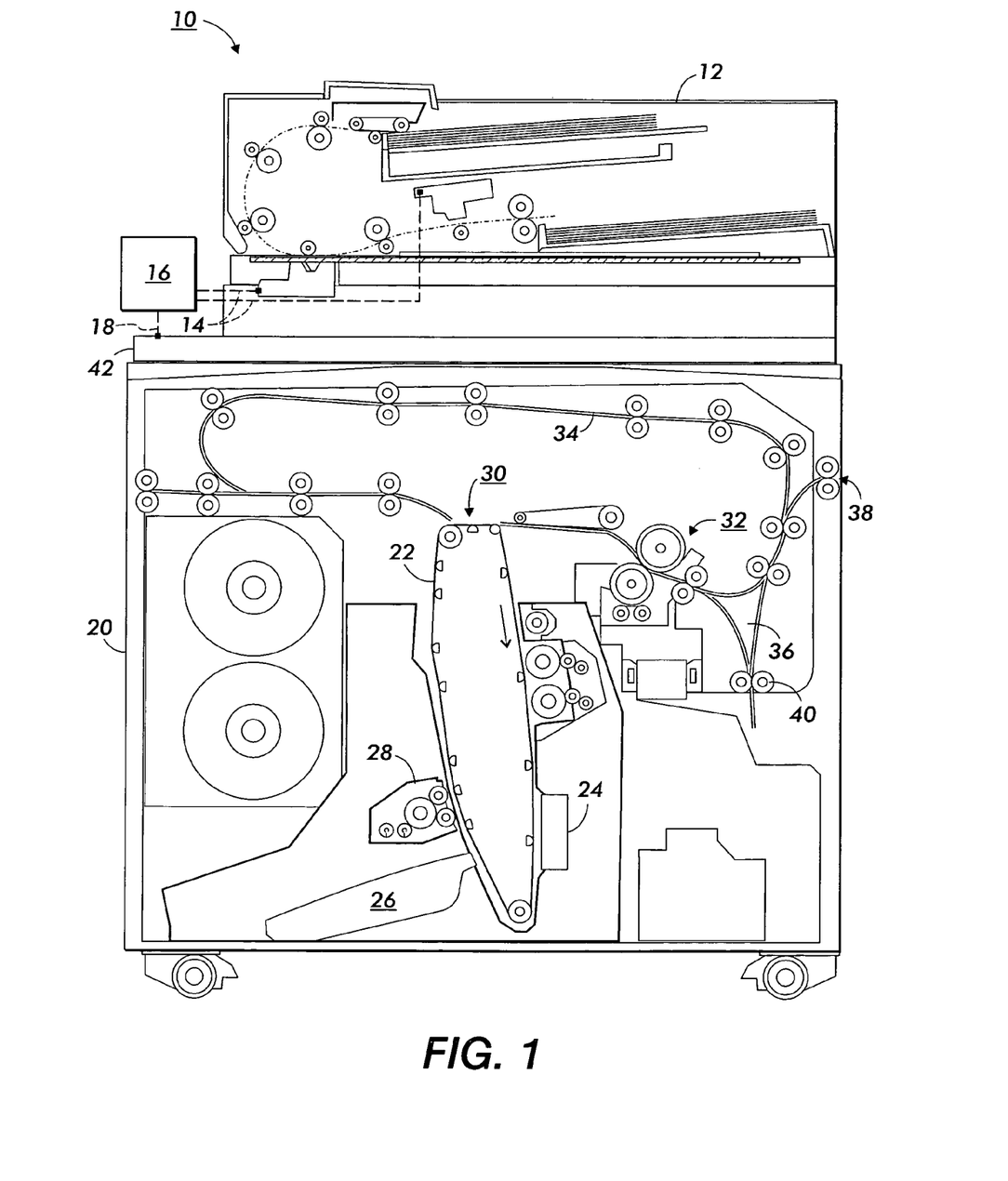
FIG. 1 is a diagram of an exemplary printing system which incorporates one or more aspects of the embodiments disclosed herein.

Turning now to FIG. 1, there is shown an embodiment of a representative printing system 10 that incorporates one or more aspects of the teachings and features disclosed herein. The illustrative printing system 10 includes a duplex document scanner 12 adapted to scan and capture image data 14 from both sides of a duplex document. Image data 14 captured by scanner 12 is supplied to an image processing system (IPS) 16 to be processed so as to produce image data 18 that is suitable for reproduction on image output terminal (JOT) or printer 20. In response to image data 18, IOT 20 generates an output document on suitable media. When printing system 10 operates to scan an original duplex document to generate and print copies thereof, IPS 16 processes the image data (including rotating the appropriate images 180 degrees to thereby the correct the orientation) and stores the processed images in memory.

For purposes of illustration, FIG. 1 shows an embodiment of an electrophotographic printer 20 that generates a document in a single pass of a charge retentive surface in the form of photoreceptor belt 22. Initially, belt 22 passes through charging station 24, where the photoconductive surface of belt 22 is charged to a substantially uniform potential using any known or conventional charging means, e.g., corotron, scorotron, pin corotron, etc. Upon passing through charging station 24, the charged image area travels through an exposure station 26. In response to image data 18, exposure station 26 generates modulated light that illuminates portions of the image area thereby altering the charge on belt 22 so as to create an electrostatic latent image on the belt. Exposure station 26 may comprise a laser based raster output scanning device, an LED printbar, or other imaging device. After receiving an electrostatic latent image, the exposed image area passes through a development station 28 at which toner is placed on the latent image using any common or known technique. After passing through development station 28, an output sheet is brought into contact with the surface of belt 22 at transfer station 30 wherein the developed image is transferred to the sheet. After transfer, the sheet is advanced to fusing station 32 wherein the toner is permanently affixed to the sheet.

Printer 20 further includes a conventional inversion duplex path 34. Briefly reviewing, after an image is fixed on a first side of a sheet, the sheet enters gate 36. If the sheet is not to receive another image (e.g., the sheet is simplex or, if duplex, the second image has been printed) gate 36 directs the sheet to exit nip 38. However, if an image is to be placed on the opposite side, the sheet is directed to a reversing nip 40. After the sheet enters the reversing nip, the sheet is stopped, reversed and transported through duplex path 34. When the first side of a sheet is printed, a lead edge of the sheet enters transfer station 30, fusing station 32 and reversing nip 40. However, after the sheet is reversed and advanced through the duplex path, as the sheet enters transfer station 30 to receive an image on the reverse side, the lead edge from the first side becomes the trailing edge of the document for the reverse side. That is, the inversion duplex path introduces a 180-degree rotation in the orientation of the sheet when operating on the second side compared to that of the first side of the sheet.

Printer 20 further includes a controller 42 to communicate with, provide data to, control, and/or coordinate interactions between the various systems and subsystems within the machine to maintain the operation of the printing machine. That is, the controller has a system-wide view and can monitor and adjust the operation of each subsystem affected by changing conditions and changes in other subsystems. Although shown as a single block in FIG. 1, it should be appreciated that system controller 42 may comprise a plurality of controller/processing devices and associated memory distributed throughout the printing device employing, for example, a hierarchical or distributed processing architecture.

It will be apparent to those of ordinary skill in the art that the printer shown may be modified to generate a color document. For example, by adding successive charging, exposure, and developing stations, a recharge, expose, and develop image on image process can be implemented such that the print engine can produce a color document in a single pass of the photoreceptor. Similarly, the print engine may comprise a single ROS and several developing stations, each having a different color toner. With such a system the print engine can produce a color document using several passes of the photoreceptor through the ROS and charging station wherein each pass is developed at a different developing station. Moreover, IOT 20 may comprise any one of a number of printing devices including, but not limited to, electrostatographic printers (e.g., laser, electrophotographic, ionographic), liquid ink printers (e.g., drop-on-demand; phase change wax-based; piezoelectric, acoustic, or thermal inkjet), thermal printers, etc.

Those skilled in the art will recognize that IPS 16 may be implemented in hardware and/or software and may reside within scanner 12, within IOT 20, within a separate component or in any combination thereof. In addition, it should be appreciated that scanner 12 may be integral with IOT 20 to comprise a digital copier whereby scanning and printing are done on an integral or modular unit at the same location. Similarly, scanner 12 may comprise an optional element which may be added to or included with a digital printer to create a digital copier. Moreover, scanner 12 may be a separate unit which may be remote from IOT 20.

Figure 2:
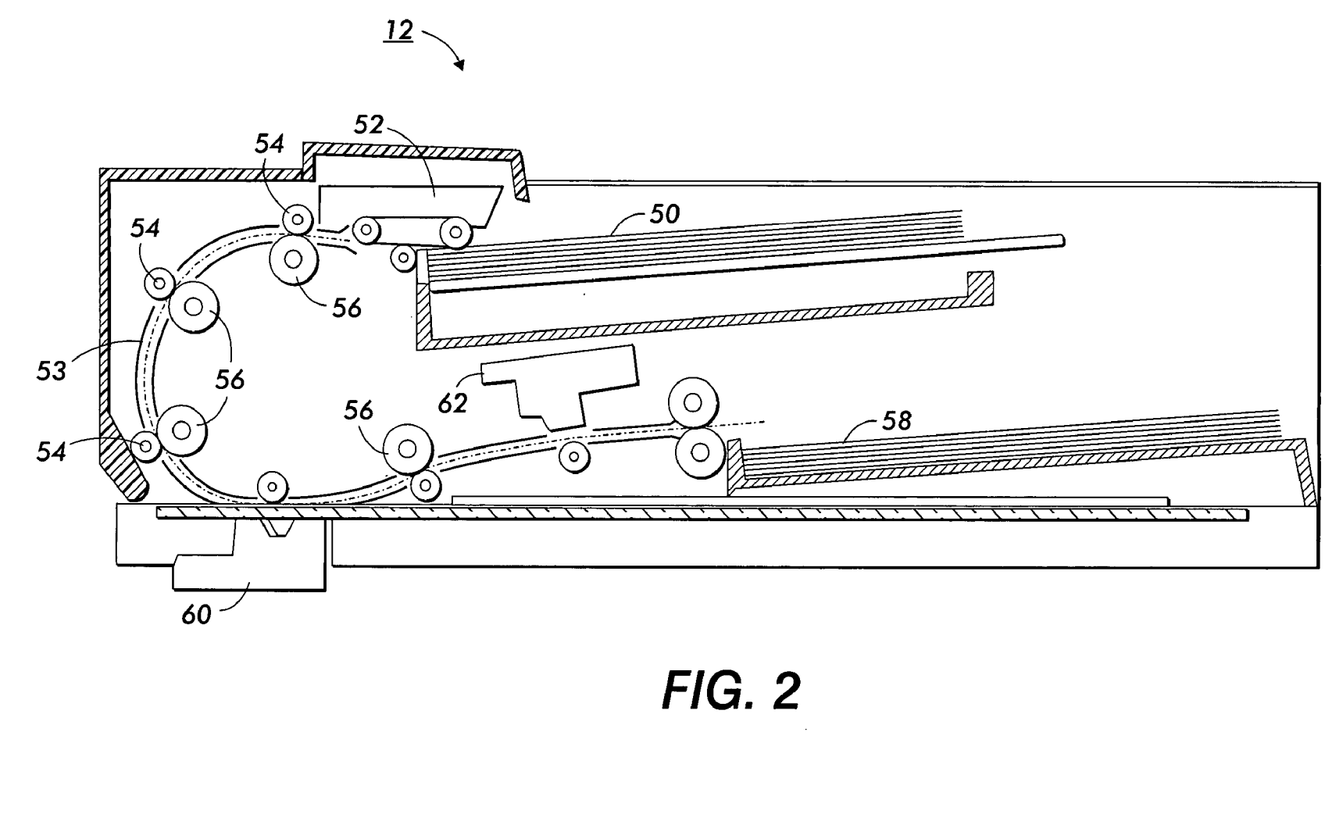
FIG. 2 illustrates an embodiment of a representative duplex document scanner.

Turning to FIG. 2, there is shown an embodiment of a representative CVT type duplex document scanner 12 operable in accordance with the teachings disclosed herein. Scanner 12 includes a tray 50 for feeding cut sheets. In the embodiment shown, sheets are removed from tray 50 using top vacuum corrugated feeder (TVCF) 52 which may be assisted by one or more air knifes (not shown). However, it should be appreciated that any means for feeding sheets may be used including, for example, one or more suction cup type grippers, one or more gripper fingers or a nudging or pick roller in contact with the top sheet may be used. In addition, the sheets may be feed from the bottom of the stack using a vacuum belt or other individual sheet output feeder.

The sheets are conveyed along transport path 53 by the use of a plurality of nip roller pairs located along the path. Each nip roller pair includes a drive roll 54 and an idler roll 56. Drive rolls are driven by a motor (not shown) that maintains the speed of the rolls and accordingly controls the speed of documents moved by the rolls to a carefully controlled velocity to transport the sheets at a controlled velocity to an exit feed tray 58. Scanner 12 further includes first and second scanning stations 60 and 62 arranged on opposing sides of the transport path 53. Each scanning station includes a scanning array or RIS that may include a linear array of photosensitive sensors such as CCD's or photodiodes that are controlled to sense light reflected from a document during an integration period. The photosensitive sensors develop a charge indicative of the amount of light detected, for transmission to image processor 16 for use in assimilating an electronically stored representation of the image on the document.

As a document passes a scanning station 60 or 62, it is illuminated by a light source (not shown). The light illuminating the document may be reflected through a lens that directs the light reflected from the document to the scanning array. It will of course be appreciated that other optical and illuminating systems may be used to illuminate and direct light from the document to the scanning array. Accordingly, images on the first or front side of documents are illuminated and scanned by scanning station 60, while images on the second or back side/face of the document are illuminated and scanned by the scanning station 62. A more detailed description of duplex scanning devices can be found in U.S. Pat. Nos. 4,743,974; 5,463,451 and 5,680,204.

Figure 3:
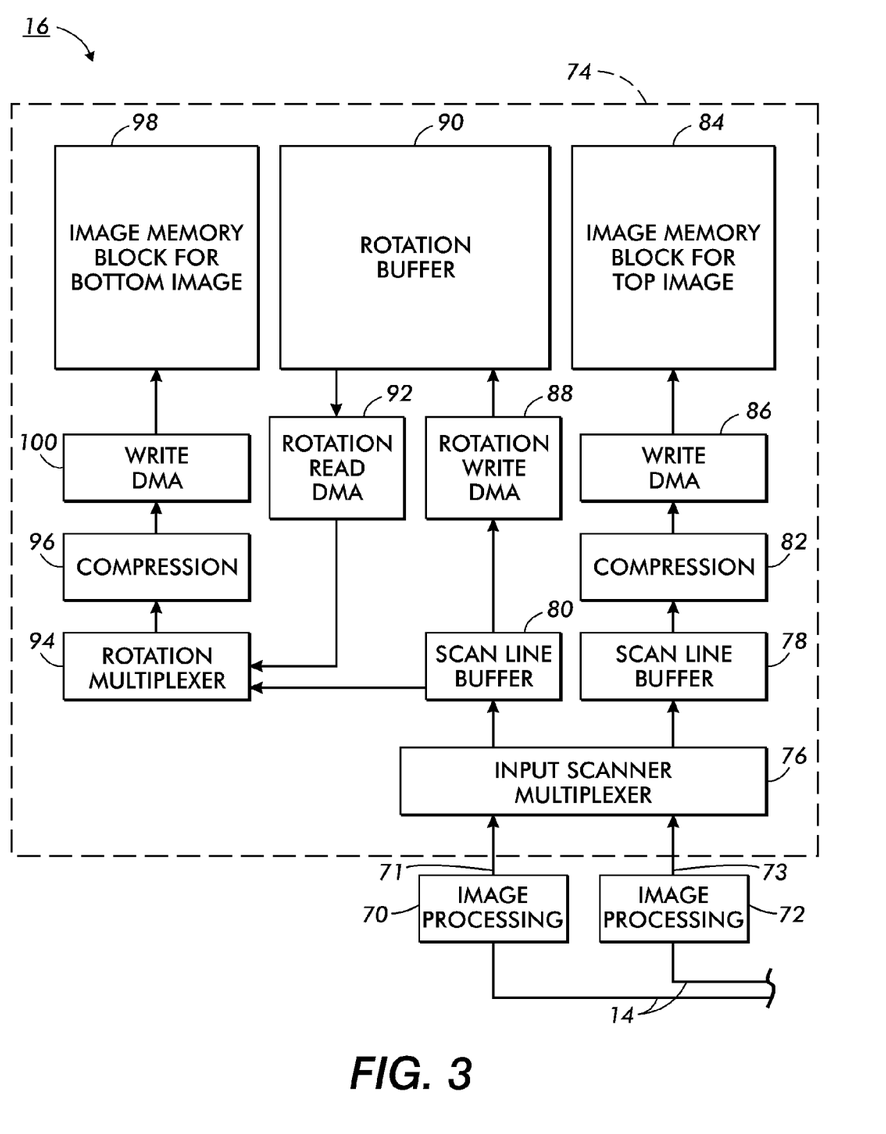
FIG. 3 is a schematic diagram of an image processing system which includes an embodiment of an image rotation processor.

Referring to FIG. 3, there is shown an illustrative embodiment of IPS 16. IPS 16 receives image data 14 captured by the scanning array or RIS from the scanning stations within the scanner at image processing modules 70 and 72. Image processing modules 70 and 72 process image data 14 to generate processed image data. Modules 70 and 72 may perform any of a number of well known, conventional image processing operations including, for example, automatic image segmentation to analyze image data, identify image segments, which may be an individual pixel or a defined group of pixels, and classify the segments as one of several possible image classes (e.g., pictorials, smooth contone, rough contone, text/line art, text on tint, halftones of various frequencies, etc.); descreening of scanned halftones; halftoning; error diffusion processing; antialias processing; edge compaction; etc.

Modules 70 and 72 may processes the image data to produce print ready image data. In addition, the processed image data may comprise any number of bits per pixel and may include classification tags as well. Briefly, classification tags may provide an indication of or hints to the image type of the corresponding pixel and/or may suggest, request, identify or denote a processing action or option to be performed on the pixel.

The processed image data is passed to image rotation processor 74. Rotation processor 74 includes an input scanner multiplexer 76 which receives processed image data for the first and second sides of the scanned document from modules 70 and 72, respectively. Multiplexer 76 directs the received processed image data to one of two scan line buffers, scan line buffer 78 in the "non-rotation path" and scan line buffer 80 in the "rotation path". When creating duplex copies from scanned duplex originals the image for the second side may need to be rotated 180-degrees due to the change in orientation of the copy sheet introduced by the inversion duplex path. However, it should be appreciated that there may be applications (e.g., when an image from the front of an original is placed on the back of the copy sheet) which require the first side to be rotated. Multiplexer 76 provides the capability to swap which scanner channels (which side of the scanned document) is supplied to the rotation or non-rotation paths on a page-by-page basis.

Scan line buffers 78 and 80 operate to buffer the image data to thereby compensate for and allow a frequency difference between the scanner system clock and the system clock for the direct memory access (DMA) controllers used to control the data flow through the rotation processor. As should be appreciated, the use of one or more DMA controllers to control data flow eliminates the need for a separate microprocessor to control data flow within the rotation processor. Similarly, it eliminates the need to interact with a system microprocessor, freeing resources on the system processor. The DMA system clock and the memory controller bandwidth determine the maximum bandwidth of the rotation module.

Following the non-rotation path, from scan line buffer 78 there is included compression module 82 wherein the image data is compressed using any known or conventional compression method suitable for the given application and/or IOT. The compressed image data is then stored in image memory block 84 storing image data for the first/front side images. Data flow through the non-rotation path is controlled by write DMA controller 86.

Following the rotation path, rotation write DMA controller 88 regulates the flow of image data through the channel from scan line buffer 80 to rotation buffer 90. That is, rotation write DMA controller 88 operates to retrieve image data from scan line buffer 80 and write the data into rotation buffer 90. Rotation buffer 90 may comprise a conventional high speed memory or similar digital data storage device/medium which can be accessed, written to and read from at high enough speeds. The rotation buffer may comprise or be defined by a single contiguous range of addressable memory or data storage. However, it should be appreciated that the buffer need not be limited to single contiguous block of memory but rather may also comprise two or more non-contiguous blocks of memory. For purposes of discussion, the lowest addresses within the range of addresses defining the rotation buffer memory will be referred to as the bottom of the buffer while the highest addresses within the range of addresses defining the rotation buffer memory will be referred to as the top of the buffer. The amount of memory allocated for rotation buffer 90 is beneficially equal to or larger than the largest expected scanned image size to be rotated.

DMA controller 88 retrieves and writes the image data in bursts, with each burst having a defined size. In one embodiment, the image data is read in bursts of one of two defined sizes, a single word burst or a block comprising multiple words (block burst). However, it should be appreciated that the use of bursts of a single defined size as well as bursts of more than two defined sizes can also be used. When using bursts of two or more defined sizes, in the event that the image data for the input image does not fall on a burst boundary for the current defined size, the rotation write DMA controller begins retrieving bursts of the next smaller size. That is, in an embodiment wherein the bursts are either block bursts or single word bursts, if the image data in scan line buffer does not fill a block or fall on a block burst boundary, the rotation write DMA controller will begin retrieving and writing single word bursts until all the image data has been placed in the rotation buffer or until the image data again falls on a burst boundary.

Rotation write DMA controller 88 may retrieve image data according to a predefined order such as sequentially as scanned, or in a random order. Similarly, the rotation write DMA controller may fill the rotation buffer in a random order or fill the rotation buffer according to predefined fill order which may be sequential memory addresses or another defined order. In one embodiment, the image data is retrieved sequentially as scanned and the predefined fill order is sequential starting from the lowest address and going to the highest address required for that image.

When writing the image into the rotation buffer, the rotation write DMA controller 88 tracks the number of bursts of image data written to the buffer. When using bursts of two or more defined sizes rotation write DMA controller 88 can track the number of bursts of each defined size as well as the order in which the different size bursts were retrieved. In addition, if the rotation write DMA controller retrieves image data in random order and/or fills the rotation buffer in a random order, the DMA controller tracks the order the data is retrieved and/or the addresses within the rotation buffer at which each burst is placed.

Once the image data for the entire scanned image is written into rotation buffer 90, rotation read DMA controller 92 begins to read the image data out of the rotation buffer in the reverse order from which it was written. That is, if image data was retrieved sequentially as scanned and the rotation buffer was filled sequentially from the lowest address to the highest address needed for the image, the rotation read DMA controller reads sequential bursts starting from the highest address going to the lowest address. For example, if the rotation write DMA controller placed 8 bursts of image data ($b_1, b_2, b_3, \ldots b_8$) into the rotation buffer followed by 3 single word bursts ($w_1, w_2, w_3$), the rotation read DMA controller would begin by reading word bursts $w_3$ from the rotation buffer followed by bursts $w_2$, and $w_1$. Rotation read DMA controller would then read bursts $b_8$ through $b_1$ from the rotation buffer. In this way the image is read out backwards accomplishing 180-degree rotation on a burst boundary.

Each word from the DMA burst read from the rotation buffer is sequentially fed through a "last in first out" (LIFO) buffer (not shown) such that the words within the bursts are rotated. As the words are read out of the LIFO buffer, each pixel within the word is re-ordered by simple re-routing according to the number of bits per pixel. In this way the 180-degree rotation of the image is completed.

The completely rotated image data is fed to rotation multiplexer 94. Rotation multiplexer 94 further receives "unrotated" image data from scan line buffer 80. Multiplexer 94 operates to direct either the rotated image data or the unrotated image data through the remainder of the rotation path. In this manner, the rotation multiplexer provides the capability to bypass 180-degree rotation on a page-by-page basis. From multiplexer 94 image data is passed to compression module 96 wherein the image data is compressed using any known or conventional compression method suitable for the given application and/or IOT. The compressed image data is then stored in image memory block 98 storing image data for the second/back side images. Data flow through compression module 96 to the image memory 98 is controlled by write DMA controller 100.

Although shown as including four separate DMA controllers 86, 88, 92, and 100, those skilled in the art will appreciate that a single DMA controller may be provided to control the data flow through rotation processor 74. That is, the functionality of the four DMA controllers 86, 88, 92, and 100 or any combination thereof can be provided by a single DMA controller. In addition, although rotation processor 74 is shown as rotating image data that has been previously processed by image processing modules 70 and 72, it should be appreciated that the rotation processor is not limited to operating on processed image data and that the processing operation performed by modules 70 and 72 can be accomplished after rotation of the image data.

Although as described above, the rotation processor operates to rotate a single image at a time, the processor can be readily adapted to rotate two images in parallel. More specifically, in one embodiment of operation the rotation processor writes bursts of image data into the rotation buffer and then reads the burst out of the rotation buffer in the reverse order. After the image has been read out of the buffer, the rotation processor begins to rotate the next image by placing bursts of image data into the rotation buffer. However, the rotation processor can readily be adapted to begin writing the second image in the rotation buffer as the first image is beginning to be read out of the buffer.

To operate on two images, the rotation processor can write the entire first image into the rotation buffer in a manner consistent with that described above. Then, as rotation processor begins to read the image data out in the reverse order, the rotation process can also begin to write bursts of image data for the next image in any available buffer space. Such buffer space may be made available by the retrieval of image data for the first image. Alternatively, the rotation processor may comprise a buffer which is slightly larger than the size required for the largest expected image. In this manner, the rotation write DMA controller can be to write image data for the second image before the rotation read DMA controller begins reading the first image from the buffer.

More specifically, in accordance with one embodiment of operation, the rotation write DMA controller places image data for an image into the rotation buffer filling the buffer from the bottom toward the top. That is, starting at an address near the bottom of the buffer and filling the rotation buffer according to a predefined fill order which generally moves towards the top of the buffer. Once the rotation read DMA operation has started, an interrupt or similar signal or notice is generated to indicate that a new input image may begin to fill the rotation buffer. Assuming that the DMA is faster than the image data is supplied from the scanner this interrupt may be ignored. When the new input image comes in, the rotation write DMA controller begins the rotation of the second image by placing the image data in the rotation buffer starting at the same end of the buffer where the rotation read DMA began reading the previous image.

In the present example, the first image was placed in the rotation buffer from bottom to top, and therefore will be read out from top to bottom. Thus, the rotation write DMA controller will write the second image into the rotation buffer starting with an address near the top of the buffer which may be the highest address of the allocated rotation buffer block. In the case where the images are exactly equal in size to the rotation buffer the second image would be written starting at the same address where the first image was read out. In the case where the images are smaller than the allocated buffer the second image could start at the highest address in the allocated buffer. In this way only one rotation buffer block needs to be allocated for all images assuming the scanner cannot go faster than the rotation DMA logic.

Continuing, when the first image has been fully read out, rotated, and compressed, an interrupt or similar signal is generated to indicate that the rotation processing for the first image is done. When the second image is finished being written into memory, if the rotation processing for the first image is completed, the second image can be read out of the buffer starting near the low end or bottom of the buffer to accomplish the rotation, and rotation write DMA controller can begin writing a third image into the rotation buffer starting with an address near the bottom of the buffer. Therefore, in a sequence of input images to be rotated, the odd number images (1, 3, 5, . . . ) will be written starting at the low end of the buffer and read starting at the high end of the buffer, and the even number images (2, 4, 6, . . . ) will be written starting at the high end of the buffer and read starting at the low end of the buffer.

What has thus been described is a system and method to rotate images. In accordance with aspects of the teachings, the rotation system can automatically rotate input images with minimal software interaction. The system uses a dedicated memory buffer to read and write images to be rotated. System software only needs to define the rotation buffer start and end address and then enable the system. In addition, there is taught an embodiment of a system and method that uses memory efficiently so that only one page size of memory is required to rotate any number of sequential input images.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A rotation processor for processing image data to generate rotated image data, comprising:
a rotation buffer having a first end, a second end, and the rotation buffer having a number of storage locations equal to a buffer size; and
a direct memory access controller, the direct memory access controller configured to:
write, through direct memory access in a sequence of bursts of image data according to a fill order, a first set of image data into the rotation buffer starting at a first image start location within the rotation buffer and ending at a first image end location in the rotation buffer, the first set of image data having a first image size smaller than the buffer size, the fill order causing the first set of image data to fill the rotation buffer in a direction towards the second end of the rotation buffer, and first image end location being separated from the second end by an additional buffer region;
read, from the rotation buffer through direct memory access in a reverse order that is a reverse order of the fill order, an initial output portion of the first set of image data that was written in a first set of memory locations within the rotation buffer;
read, from the rotation buffer through direct memory access in the reverse order, a subsequent output portion of the first set of image data from a second set of memory locations within the rotation buffer, wherein the second set of memory locations are different from the first set of memory locations in the rotation buffer;
write, through direct memory access in the reverse order, subsequent to writing the first set of image data and prior to the reading of the initial output portion of the first set of image data, an initial input portion of a second set of image data into the additional buffer region; and
write, through direct memory access in the reverse order and contemporaneously with and prior to completing the reading the initial output portion the first set of image data from the first set of memory locations within the rotation buffer, a subsequent input portion of the second set of image data into the first set of memory locations within the rotation buffer, wherein the first set of memory locations within the rotation buffer contained the initial output portion of the first image data prior to the reading the subsequent output portion of the first set of image data.

2. The rotation processor according to claim 1, further comprising a rotation memory block for receiving image data read from the rotation buffer by the direct memory access controller.

3. The rotation processor according to claim 2, further comprising:
a second scanline buffer; and
an input multiplexer having an input to receive the image data from the first page, the input multiplexer directing the image data received from the first page to one of the first and second scanline buffers, and directing the image data from the second page to the other one of the first and second scanline buffers.

4. The rotation processor according to claim 3, further comprising a non-rotation memory block, wherein the direct memory access controller further operates to control the flow of image data from the second scanline buffer to the non-rotation memory block.

5. The rotation processor according to claim 1, wherein the direct memory access controller further operates to:

generate, in response to starting the reading of the initial output portion, a signal, and wherein the writing of the initial input portion of the second set of image data begins in response to the signal.

6. A system for generating duplex copies from hardcopy originals, comprising:

a scanning device capturing scanned image data from a multi-page document, the scanning device having a first scanning station for capturing image data from a first side of each page of the multi-page document and a second scanning station for capturing image data from a second side of each page of the multi-page document;

a rotation processor generating rotated image data, the rotation processor including:

a scanline buffer receiving the scanned image data from the second side of first and second pages of the multi-page document, the scanned image data of the second side of each of the first and second pages needing to be rotated 180-degrees, a rotation buffer having a first end, a second end, and the rotation buffer having a number of storage locations equal to a buffer size, and a direct memory access controller, the direct memory access controller operating to:

write a first set of the scanned image data from the second side of the first page into the rotation buffer according to a fill order starting at a first image start location within the rotation buffer and ending at a first image end location in the rotation buffer, the first set of scanned image data having a first image size smaller than the buffer size, the fill order causing the first set of scanned image data to fill the rotation buffer in a direction towards the second end of the rotation buffer, and first image end location being separated from the second end by an additional buffer region;

read a second set of image data that is less than a complete page of bursts of the scanned image data from the second side of the second page;

read, from the rotation buffer in a reverse order that is a reverse order of the fill order, an initial output portion that is less than a complete page of bursts of the scanned image data from the second side of the first page that was written in a first set of memory locations within the rotation buffer;

read, from the rotation buffer in the reverse order, a subsequent output portion of the scanned image data from a second set of memory locations within the rotation buffer, the subsequent portion comprising a remainder, relative to the less than a complete page of bursts, of the complete page of bursts of the scanned image data from the second side of the first page, wherein the second set of memory locations are different from the first set of memory locations in the rotation buffer;

write in the reverse order, subsequent to writing the first set of scanned image data and prior to the reading of the initial output portion, an initial input portion of a second set of image data into the additional buffer region; and write, contemporaneously with and prior to completing the reading the initial output portion the first set of scanned image data from the first set of memory locations within the rotation buffer, a subsequent input portion of the second set of image data into the first set of memory locations within the rotation buffer, wherein the first set of memory locations within the rotation buffer contained the initial output portion prior to the reading the subsequent output portion; and an image output terminal connected to receive the rotated image data.

7. The system according to claim 6, wherein the rotation processor further comprises:

a non-rotation memory; and an input multiplexer having an input to receive the scanned image data from the second side of one of the first page and the second page, the input multiplexer directing the scanned image data to one of the rotation buffer and the non-rotation memory.

8. A method of processing image data to generate rotated image data, the method comprising:

receiving image data from a scanning device, the image data including first side data and second side data, both the first side data and the second side data comprise image data that needs to be rotated 180-degrees;

writing, starting at a first image start location within a rotation buffer and ending at a first image end location in the rotation buffer, bursts of a first set of image data corresponding to the first side data into the rotation buffer according to a fill order, the rotation buffer having a first end, a second end, and the rotation buffer having a number of storage locations equal to a buffer size, the first set of image data having a first image size smaller than the buffer size, the fill order causing the first set of image data to fill the rotation buffer in a direction towards the second end of the rotation buffer, and first image end location being separated from the second end by an additional buffer region;

reading a second set of image data corresponding to the second side data;

reading, from the rotation buffer in a reverse order that is a reverse order of the fill order, an initial output portion of the first set of image data that was written in a first set of memory locations within the rotation buffer;

reading, from the rotation buffer through direct memory access in the reverse order, a subsequent output portion of the first set of image data from a second set of memory locations within the rotation buffer, wherein the second set of memory locations are different from the first set of memory locations in the rotation buffer;

writing in the reverse order, subsequent to writing the first set of image data and prior to the reading the initial output portion of the first set of image data, an initial input portion of a second set of image data into the additional buffer region; and writing, in the reverse order and contemporaneously with and prior to completing the reading the initial output portion the first set of image data from the first set of memory locations within the rotation buffer, a subsequent input portion of the second set of image data into the first set of memory locations within the rotation buffer, wherein the first set of memory locations within the rotation buffer contained the initial output portion of the first image data prior to the reading the subsequent output portion of the first set of image data.

9. The method of processing image data according to claim 8 wherein the first side data is written into the rotation buffer using bursts comprising of a first burst having a first size of at least two predefined sizes and a second burst having a second size of the at least two predefined sizes, the first size being different than the second size, wherein the bursts are contemporaneously written and stored in the rotation buffer as part of the first side data.

10. The method of processing image data according to claim 9 wherein the second side data is written into the rotation buffer using bursts comprising of a first burst having a first size of two predefined sizes and a second burst having a second size of the of two predefined sizes, the first size being different than the second size, wherein the bursts are contemporaneously written and stored in the rotation buffer as part of the second side data, with all the second side data having been stored in the rotation buffer or until the second side data stored in the rotation buffer falls on a burst boundary.

11. The method of processing image data according to claim 8 wherein the fill order sequentially fills the rotation buffer.

12. The method of processing image data according to claim 8 further comprising feeding the burst of the first side data through a last in first out buffer.

\* \* \* \* \*